INVENTOR
Harold E. Wells

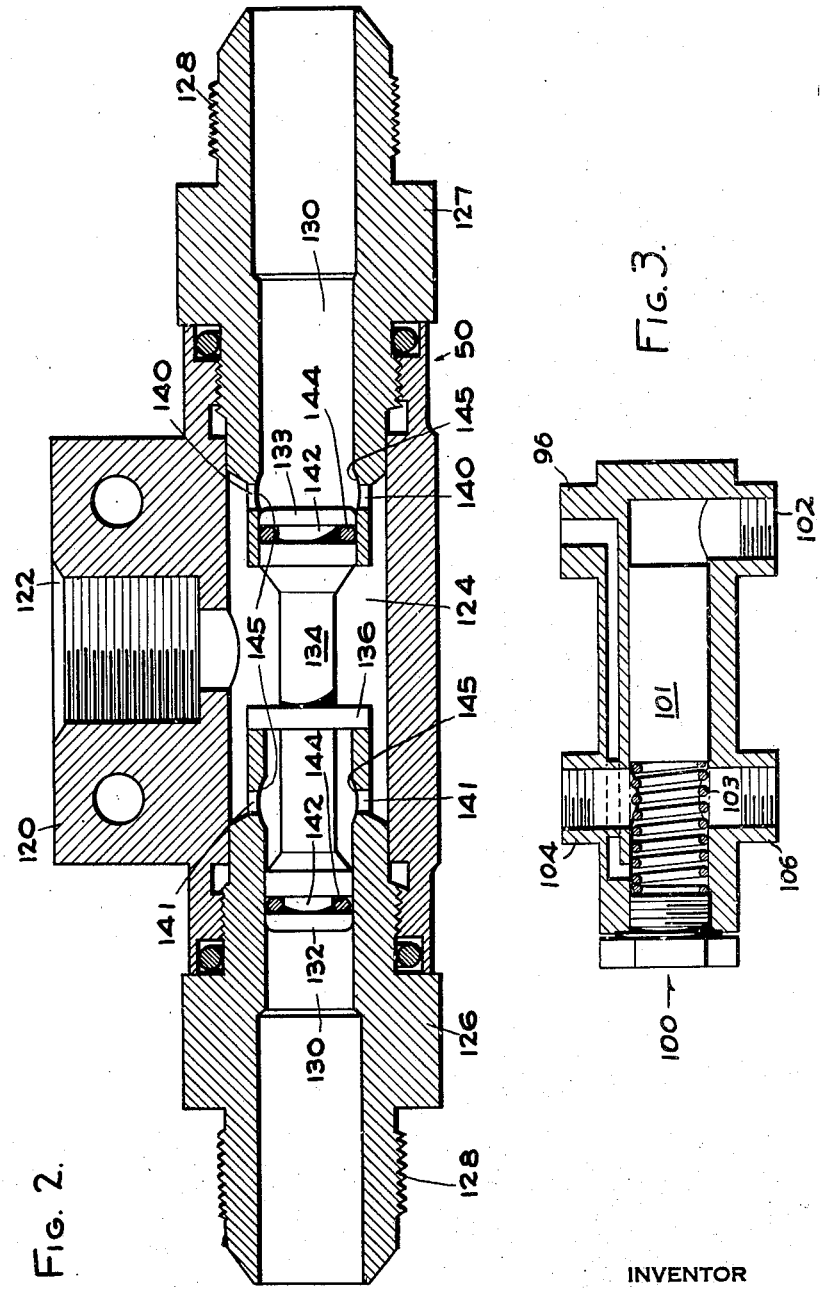

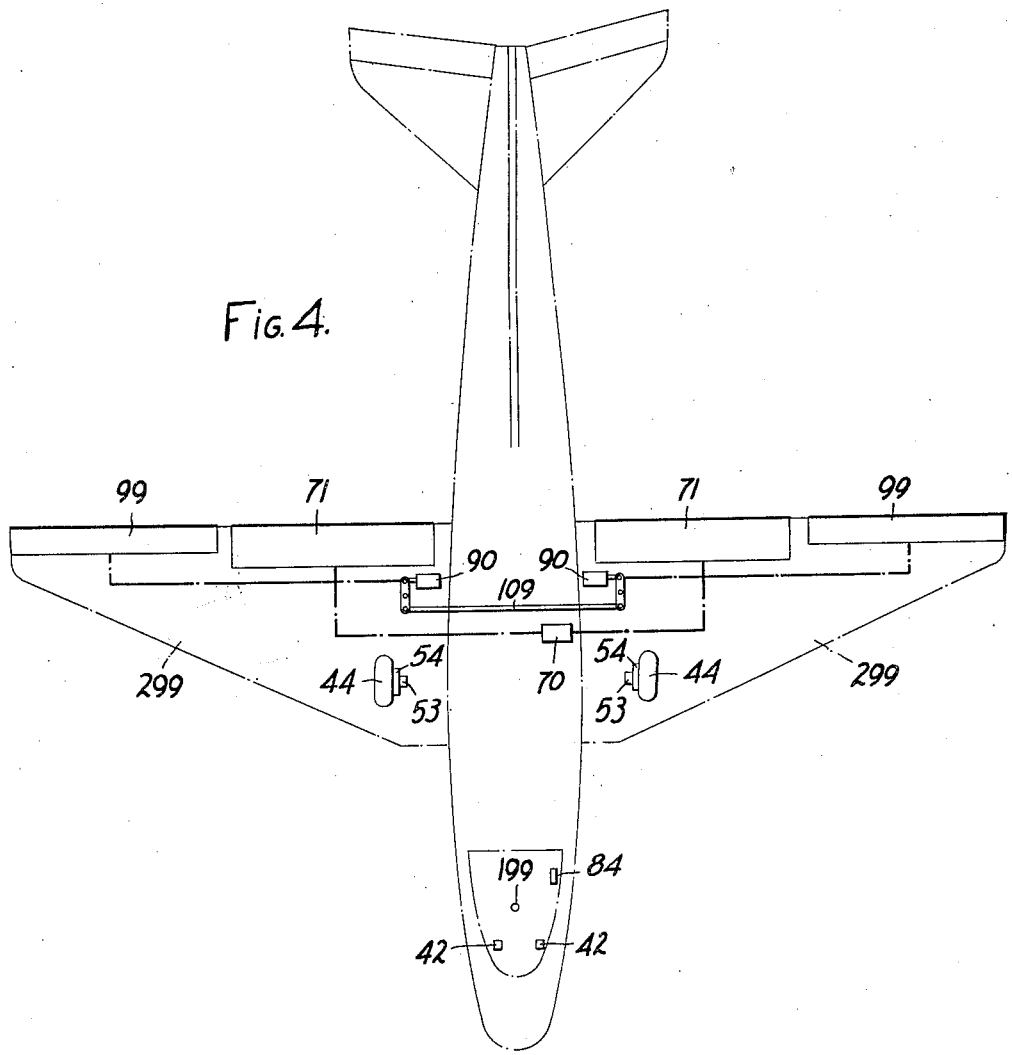

Patented Apr. 11, 1950

2,504,096

UNITED STATES PATENT OFFICE 2,504,096

AIRCRAFT CONTROL SYSTEM

Harold E. Wells, Kenmore, N. Y., assignor to Bell Aircraft Corporation, Wheatfield, N. Y.

Application June 2, 1947, Serial No. 751,825

12 Claims. (Cl. 244—111)

This invention relates to aircraft, and more particularly to an improved hydraulic system for control of aircraft elements such as wheel brakes; ailerons; landing or dive recovery flaps; and the like.

A primary object of the present invention is to provide an improved hydraulic system for aircraft which includes an improved multiple fluid pressure source arrangement for actuating various of the aircraft components such as the wheel brakes; ailerons; wing flaps; and the like.

Another object of the invention is to provide an improved hydraulic system in aircraft whereby means are provided to supply pressured fluid to operating elements of the aircraft as stated hereinabove, said supply means embodying an improved dual element fluid supply arrangement, and adjustment means therefor whereby the system operates automatically as in response to gun fire damaging of one element of the supply system so as to enable continued unaffected normal operation of the aircraft elements. Another object of the invention is to provide in aircraft an improved hydraulic system for powering the aircraft components as explained hereinabove; said system embodying dual pressure supply elements and automatic control arrangements therefor, whereby without pilot attention the system is capable of continuous functioning to provide normal pilot control of said components in spite of gun fire damage or the like to either one of the elements of the control system.

Another object of the invention is to provide in aircraft an improved hydraulic system for pilot control of aircraft accessories or operative elements; said system providing multiple hydraulic pressure transmitting systems so inter-related that upon malfunctioning of one of said systems the other system will automatically operate to perform the intended control actuations in response to only normal pilot manipulations of the system control units.

Another object of the invention is to provide an improved hydraulic system in an aircraft for pilot control of operative elements of the aircraft; said system embodying a dual power transmitting arrangement interconnecting a pilot operable control device and an aircraft mechanism to be controlled thereby; said system embodying a normal control transmission means normally operable to translate pilot actions into control device operations, and emergency control transmission means adapted to provide similar operations in response to similar pilot actions whenever said normal control transmission system may be rendered inoperative.

Another object of the invention is to provide in aircraft a hydraulic system embodying the features and advantages aforesaid without requiring the attention of the aircraft personnel and without requiring manual adjustments of the system control means in order to convert from normal to emergency operation. Other objects and advantages of the invention will appear in the specification hereinafter.

In the drawing:

Fig. 2 is a section through a shuttle valve device thereof; and

Fig. 3 is a section through a bypass valve device thereof.

Fig. 4 is a phantom view of an aircraft showing an exemplary relationship of devices of the invention to structural elements of a typical aircraft.

Figure 1:
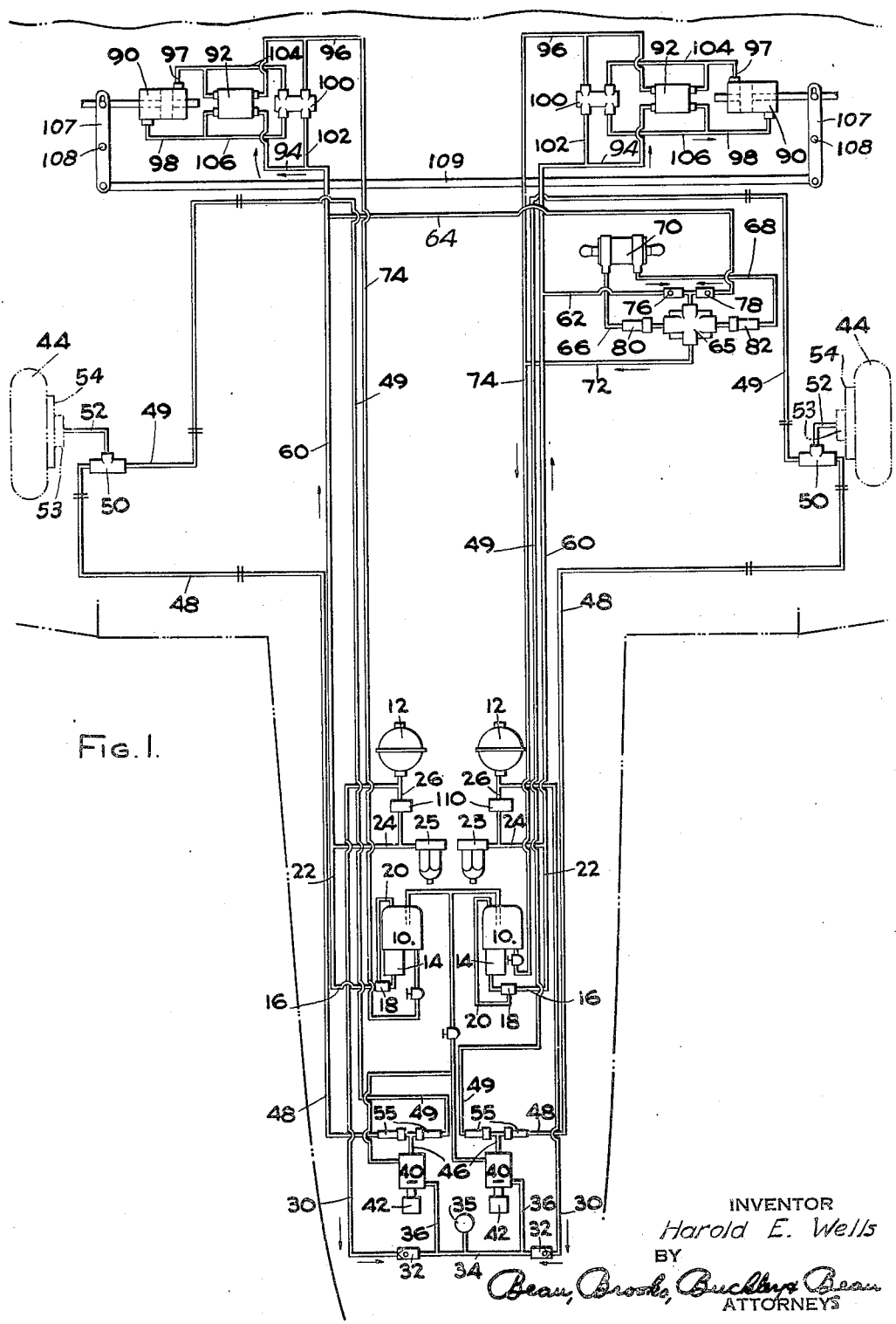
Fig. 1 is a fragmentary diagrammatic plan of an aircraft hydraulic system of the invention.

It has been heretofore proposed to provide aircraft hydraulic systems such as for controlling the aircraft wheel brakes, ailerons, wing flaps, and the like to comprise duplicate hydraulic pressure transmission means; whereby upon misfunctioning of the normal control system the pilot may switch over the control system to the secondary or emergency control arrangement. It has also been previously proposed to provide duplicate pressured fluid sources and selective control means therefor, whereby whenever it becomes necessary the pilot may change over from one power supply system to the other, as in the case of gun fire damage to the normally employed system. However, such arrangements of the prior art have invariably required undesirable complication and duplication of mechanical devices and pressured fluid conduits and the like; as well as being extremely disadvantageous in operation because the pilot does not become aware of a damaged brake line for example until after he has attempted to apply the brakes through operation of the normal brake control system. He would be thereupon obliged to manually adjust one or more control devices in order to switch the system over to the emergency control arrangement, and he must perform this function at a moment when control of the aircraft is usually at a most critical stage. Another disadvantage of such prior art dual line type arrangements is that the hydraulic fluid thereof must travel in any given case of operation either completely through the main system lines or through the emergency system lines. For example, in such cases if portions of both the main line and the emergency line become damaged as by gun fire, both systems are thereby rendered inoperative.

The present invention avoids the difficulties and disadvantages hereinabove set forth by providing an aircraft hydraulic system which embodies a novel arrangement of pressured fluid supply and pilot control and interconnecting conduit devices, in conjunction with automatically operable control elements as will be hereinafter described. The drawing illustrates for example a typical control arrangement of the invention wherein a pair of fluid reservoirs are employed as indicated at 10—10 in conjunction with corresponding pressure accumulator devices as indicated at 12—12. A pressure pump 14 is employed to deliver pressured fluid from each reservoir. It is to be understood, however, that the dual arrangement of reservoir and accumulator and pump devices shown in the present application is only for the purpose of providing a hydraulic system which is not dependent upon proper operation of only one reservoir-accumulator and pump unit, and that if preferred the invention may be applied as well to a single reservoir and pump system. The arrangement illustrated in the drawing provides normally for continuous operation of both pump systems to operate jointly to supply pressured fluid to the entire aircraft hydraulic system. Or, the system may be adjusted to provide selective operation of either one of said pump units to supply pressured fluid to the entire hydraulic system without respect to which portions of the hydraulic system may be inoperative at any given time.

The pressured fluid supply devices of the system are illustrated in the drawing to include in each case the oil reservoir 10 and a corresponding pump 14 arranged to discharge into a conduit 16. The conduits 16 incorporate in each case a pressure unloading valve 18; the over-flow port of which connects to a conduit 20 for by-passing the pump discharge to return to the reservoir 10 whenever the pressure in the system exceeds a predetermined valve. Thus, it will be understood that any suitable type of pressure unloading valve may be employed as indicated at 18 to maintain the fluid pressure within the hydraulic system substantially constant. As shown herein each conduit 16 connects into a corresponding conduit 22 which in turn couples into a conduit 24 leading to a corresponding pressure controlled signal lamp 25. A branch conduit 26 also leads away from the pressured fluid supply line into the corresponding accumulator 12. Thus, whenever the fluid pressure in one of the lines 22—22 is reduced below a predetermined limit the corresponding signal lamp 25 will be automatically operated to flash a warning to the aircraft personnel.

The aircraft landing wheel brake arrangement of the invention is illustrated in the drawing to include a fluid pressure supply line 30 leading from each of the accumulator conduits 26—26 through corresponding check valves 32—32 into a common pressure supply line or manifold 34 carrying a pressure gauge 35. Fluid lines 36—36 extend from the manifold 34 into corresponding intake ports of a pair of control valves 40—40 which are arranged to be pedal-actuated by the pilot who will selectively apply foot pressures against the pedal devices 42—42 in order to obtain differential braking effects on the landing wheels at opposite sides of the airplane, which are indicated at 44—44. The pressured fluid discharge ports of the valves 40—40 are connected to corresponding lines 46—46 each of which openly connects into a pair of conduits 48—49 which extend into open connections with opposite ends of a corresponding shuttle valve device 50 adjacent each of the wheels 44—44.

The shuttle valves 50—50 may be of any suitable type such as to be responsive to pressure differences in the lines 48—49 whereby to interconnect in each case a pressure delivery conduit 52 with whichever of the conduits 48—49 may be under the highest pressure for the delivery of pressure to the hydraulic jack 53 of the wheel brake mechanism 54. To insure that the shuttle valve 50 will be adjusted under all conditions to deliver either from the conduit 48 or from the conduit 49, the plunger portion of the shuttle valve will be differentially loaded. This may be accomplished by providing a slight spring loading thereof in one direction while providing the opposed piston areas thereof to be equal; or by simply providing the opposed pistons thereof to be of different areas as illustrated by Fig. 2 of the drawing. A detailed description of the valve of Fig. 2 is contained hereinafter.

A hydraulic fuse as indicated at 55 is installed in each of the conduits 48—49 and preferably at positions relatively close to the pilot operable valves 40—40. The fuses 55 may be of any suitable standard type and so adjusted as to permit only predetermined amounts of fluid flow therethrough prior to being operated automatically to close the line mounting the fuse. Hence, it will be understood that application of foot pressure by the pilot against the right hand pedal 42, for example will actuate the corresponding valve 40 so as to permit pressured fluid to pass therethrough into the conduits 48—49. Although the pressures thereby introduced into these lines are equalized, the differential loading of the shuttle valve 50 will cause the latter to move to close either one of the conduits 48—49 while pressured fluid moves through the other conduit and into the brake actuating conduit 52; thereby applying a braking force upon the right hand wheel 44. Similarly, application of pilot foot pressures against the left hand pedal 42 will produce corresponding braking forces upon the left hand wheel 44; and it is noteworthy that under all such operating conditions only one of the conduits of each pair of conduits 48—49 are called into operation. Therefore, if the inactive conduit be disrupted as by enemy gun fire or the like, the pressure within the corresponding brake actuating conduit 52 will not be bled into the disrupted conduit because the shuttle valve 50 is set to seal the connection therebetween; and the leakage from the disrupted conduit will be permitted only momentarily because flow of fluid through the fuse 55 will be automatically halted by operation of the fuse in the disrupted line.

It will be understood that upon relaxation of pilot foot pressures against the brake pedals, the valves 40—40 controlled thereby will be returned to "off" position in response to spring devices thereon, and the valves will thereupon permit return flow of small amounts of fluid such as is necessary to permit the wheel brake actuators to return to non-braking positions, as in response to spring devices thereon. In this respect it is also noteworthly that the shuttle valves 50—50 are self-bleeding for the entire brake system because whenever the brake pedal is released the higher pressure in the brake actuator shifts the shuttle valve whereby air bubbles in the fluid will be permitted to return to the reservoir 10 through the emergency lines and the pedal valves. Therefore, in order to bleed the brake system of air bubbles at any time it is only necessary to pump the brake pedals, and the need for special servicing operations to maintain the system in optimum condition is therefore obviated.

Conduits 60—60 are openly connected to the conduits 22—22 to conduct pressured fluid from the supply pumps 14—14 to the aileron and flap actuating mechanisms of the aircraft. For example, the right hand conduit 60 connects into a line 62 and the left hand conduit connects into a line 64 leading into the inlet port of a four-way valve 65. The opposite pressure ports of the valve 65 connect through lines 66—68 to opposite ends of a hydraulic jack 70; it being understood that the armature of the jack 70 will be connected to the aircraft flap actuating mechanism for pivoting the flaps 71—71 in opposite directions, as is indicated diagrammatically in Fig. 4. The oil return port of the valve 65 connects through a conduit 72 into a main oil return line 74 which discharges into the right hand reservoir 10. The pressure supply conduits 62—64 are furnished with separate check valves 76—78 which permit fluid flow therein only toward the valve 65. The jack operating conduits 66—68 are fitted with hydraulic fuses 80—82 which are set to permit only small loss of fluid as in response to disruption of the connected conduit prior to closing of the fuse device.

The valve 65 is arranged to be pilot-actuated in either direction so as to procure either raising or lowering of the aircraft flaps 71—71; and for this purpose the valve 65 may be actuated for example by a solenoid device which is remotely controlled by a switch 84 (Fig. 4) located in the pilot cockpit. Thus, it will be understood that the fluid actuating system of the airplane provides a dual pressure supply arrangement whereby if either of the pressure supply conduit systems fail the other system will continue to function for optimum actuation of the flap control jack 70 without pilot attention or adjustment of selector valves or the like.

The aileron control system of the aircraft is illustrated to comprise a pair of hydraulic jacks 90—90 separately controlled by corresponding four-way valves 92—92. Conduits 94—94 connect the pressured fluid supply lines 60—60 to the pressure inlet ports of the corresponding control valves 92—92, and conduits 96—96 connect the fluid return ports of the valves 92—92 to the corresponding main return lines 74—74 which convey return fluids from the system into the reservoir 10—10. The alternate pressured fluid disposal ports of the valves 92—92 are connected into opposite ends of the corresponding hydraulic jacks 90—90 by conduits 97—98.

The valves 92—92 are arranged to be pilot-controlled by any suitable remote control system such as a pilot adjustable means in the aircraft cockpit for selectively adjusting the valves 92—92 between inoperative and operative positions for procuring either upward or downward deflections of the connected ailerons, as required for flight control of the aircraft. Thus, it will be understood that the control valves 92—92 may be arranged to be actuated by any suitable means in response to pilot manipulations of a single control device 199 (Fig. 4) so as to procure simultaneous oppositely directed hinging movements of the ailerons 99—99 at opposite sides of the aircraft wing 299; as is well known in the aircraft control art.

Preferably, an automatically operating by-pass valve is employed as illustrated at 100—100 in conjunction with each of the aileron control jacks 90—90 so as to permit the control jacks 90—90 to become freed from control by the hydraulic system of the aircraft in event that misfunctioning of the pressured fluid supply device results in lowering of the pressure to such degree as to render the hydraulic control system incompetent to properly control the aircraft. For example, the valves 100—100 may each comprise a cylinder containing a piston 101 which is normally biased by the fluid pressure forces of the control system as introduced into one end of the cylinder through conduit 102 leading from the pressure supply means 60—60 so as to be displaced to the left from the position thereof shown in Fig. 3 against the action of a spring 103 within the valve casing. Under this condition the piston of the valve device will be disposed to close off otherwise intercommunicating ports of the valve casing which are connected to conduits 104—106 leading from the jack supply conduits 97—98. Therefore, the by-pass valves 100—100 are normally inoperative and have no effect upon the aileron actuating system; but in event of fluid pressure failure in the system the pistons of the valves 100—100 will thereupon shift so as to intercommunicate the conduits 104—106, thus providing for free circulation of fluid through the course defined by the conduits 104-106 and through the jack 90 and by-pass valve 100. Thus, the jack is freed from all restraint by the hydraulic control system, and it is arranged that the pilot will under such circumstances have control of the ailerons through the remaining operative jack by means of a mechanical interconnection between the ailerons, comprising levers 107—107 pivoted at 108—108 and each connected at one end to the corresponding hydraulic jack and at the other end to a transverse push-pull member 109. A bleed-off port is provided in each by-pass valve 100 for connection to the return conduit 96, to permit the piston 101 to travel as explained.

Thus, it will be appreciated that the invention provides an improved hydraulic control system for aircraft which embodies multiple safety features permitting normal control of the aircraft in spite of damage or misfunctioning of parts thereof; the selective use of various portions of the control system being automatically arranged without attention thereto by the aircraft personnel. For example, as explained hereinabove, in event that one phase of the landing wheel braking system is disrupted the conduit devices thereof are automatically sealed against disastrous loss of fluid and the shuttle valves operate automatically to switch the undamaged phase of the system into operation. Therefore, the pilot need not even be aware of the fact that a portion of the hydraulic system is damaged, and complete braking control is maintained without pilot adjustments of control switch-over means or the like.

Also, in event that one of the reservoir-pump phases of the hydraulic system becomes damaged, as being shot away by gun fire, the corresponding check valve 32 operates automatically to shunt the other pressure supply phase of the system into both of the brake pedal control systems. It is also preferably arranged that in event the electric power supply system of the aircraft becomes damaged so as to halt the pumping operations of the devices 14—14, the pressure previously stored within the accumulators 12—12 will be preserved for a final operation of the landing wheel brakes. This may be accomplished by installing solenoid operated valves 110—110 in the conduits 26—26; the valves 110—110 being arranged so that whenever the electric power fails the valves 110—110 will automatically close and thereby prevent flow of fluid from the accumulators 12—12 into the conduits 24—24 which in turn feed the flap and aileron actuating systems. Thus, the aileron and flap devices of the aircraft may be arranged to be emergency-operated under such conditions by mechanical devices independently of the hydraulic system of the aircraft which will enable the pilot to bring the aircraft home subsequent to damaging of the hydraulic system, while leaving the braking system unaffected and fully operable without pilot attention and adjustments thereto for employment of the fluid pressures stored within the accumulators 12—12 for a final landing operation.

As stated hereinabove, a detailed description of the shuttle valve controlling the wheel brake actuator will now be given. As illustrated in Fig. 2, the valve 50 includes a T-shaped housing 120 having a port 122 for threaded connection to the brake actuating conduit 52 of Fig. 1. The port 122 leads into a transverse chamber portion 124 which is fitted at its opposite ends with nipples 126—127; the nipples being threaded as at 128—128 for connection to the conduits 48—49, respectively. The nipples 126—127 are interiorly bored as at 130 so as to slidably receive therein opposed heads 132—133 of a piston 134. The nipple bores and corresponding piston heads are of different diameters whereby, for example, the piston head 132 at the left side of the plunger of Fig. 2 is of smaller diameter than of the piston head 133 at the right hand end of the plunger. Thus, it will be understood that as hereinabove explained, upon application of equal fluid pressure forces through the nipples 126—127 at opposite ends of the shuttle valve the plunger 134 will be automatically shunted to the left, as to the position thereof shown in Fig. 2. A stop device 136 is formed integral with the plunger 134 so as to be adapted to abut the inner ends of the nipple devices for limiting the movements of the plunger.

The nipples 126—127 are ported as indicated at 140—141; the ports being so arranged that whenever the piston 134 is pressure-shunted to the position thereof shown in Fig. 2 the piston head 132 seals the fluid from the conduit connected to the nipple 126 against escape through the ports 141; whereas the piston head 133 at the right hand end of the plunger 134 has been moved so as to permit free circulation of fluid from the conduit connected to the nipple 127 into the valve chamber 124 for delivery through the port 122 and thence through the conduit 52 connected to the right hand nipple 127 of the shuttle valve becomes distrupted as by gun fire damage or the like with the result that fluid escapes therefrom and thereby reduces the fluid pressure forces therein, the then higher fluid pressure forces within the conduit connected to the left hand nipple 126 will operate to shunt the piston 134 to the right and away from the position thereof shown in Fig. 2 until the stop device 136 abuts the inner end of the right hand nipple 127 of the shuttle valve. When in this position the piston 134 will seal the fluid chamber 124 from the interior of the right hand nipple 127 and will permit free circulation of pressured fluid from the conduit connected to the left hand nipple 126 into the chamber 124 and thence into the conduit 52 connected to the wheel brake actuator or jack 53. Thus, the valve is adapted to automaticcaly operate to switch the wheel brake system over to the undamaged phase thereof without attention from the aircraft pilot.

The shuttle valve device of the invention embodies particular features and advantages which operate to maintain the valve device in condition for optimum service. For this purpose the piston heads 132—133 are annularly grooved as indicated at 142—142 and fitted therein with O ring type fluid seal devices 144 which are doughnut-shaped and formed of relatively soft elastomer material such as natural or synthetic rubber, or rubber compositions or the like. Thus, the seals 144 are adapted to prevent undue leakage of fluid past the piston heads 132—133.

This installation of O ring seals, however, presented a critical problem in that the shuttling movement of the piston 134 causes the piston heads to move back and forth across the positions of the ports 140—141 through the nipple walls. Initially the inner walls of the nipples in the regions of the ports 140—141 were shaped to maintain complement alignment with the piston heads, but it was determined that in such an arrangement the O ring seals were relatively rapidly ruptured by shearing contacts with the edges of the ported portions of the nipples. To avoid such damage to the O ring seals so as to make their application to this installation practicable, the inner walls of the nipples in the regions of the ports 140 thereof are spherically recessed as indicated at 145; whereby although the seals 144 are permitted to flex outwardly into the recessed approaches to the ports 140 they are subsequently cammed back smoothly into alignment with the iner bores of the nipple devices without being subjected to scissors-type cutting actions between the piston heads and the nipple walls. It has now been determined that such recessing of the approaches to the ports through the cylinder walls prevents the damage to the sealing devices hereinabove referred to.

Although only one form of the invention has been shown and described in detail, it will be apparent to those skilled in the art that the invention is not so limited but that various changes may be made therein without departing from the spirit of the invention or the scope of the appended claims.

I claim:

1. In an aircraft ground wheel braking system, a wheel brake, a hydraulic jack coupled for operation of said brake, a pair of functionally separate hydraulic pressure supply conduits, a shuttle valve device connected at its opposite ends to different of said conduits whereby to apply hydraulic pressures at opposite ends of said shuttle valve device, said shuttle valve device including a member movable therein in response to differences of pressures thereagainst from said conduits whereby to alternately intercommunicate one of said conduits with said hydraulic jack, a fluid pressure power supply control valve coupled to said conduits and operable by the airplane pilot to permit controlled passage of pressured fluid through said conduits simultaneously, said conduits each having a hydraulic passage fuse device therein at positions closely adjacent said control valve for permitting only predetermined amounts of fluid to flow therethrough incidental to each fluid flow operation.

2. In an airplane, a pair of separate pressured fluid supply devices, an airplane control device, a hydraulic jack for operating said airplane control device, conduit means connecting each of said pressured fluid supply means to said hydraulic jack, shuttle valve means interconnecting said conduits at positions adjacent said hydraulic jack and automatically operable in response to pressure differences within said conduits to openly connect into said hydraulic jack only whichever conduit applies to said shuttle valve the highest pressure.

3. In an airplane, a plurality of separate fluid pressure supply devices, wing lift change means, a hydraulic jack coupled to said wing lift change means for operation thereof, conduit means connecting each of said pressured fluid supply means to said hydraulic jack, shuttle valve means interconnecting said conduits at positions adjacent said hydraulic jack and automatically operable in response to pressure differences within said conduits to openly connect into said hydraulic jack only whichever conduit applies to said shuttle valve the highest pressure.

4. A shuttle valve device comprising a casing having a cylindrical bore therethrough and a pair of fluid inlet ports and a third fluid outlet port in open communication with said bore, a piston-valve reciprocable within said casing bore and movable therein to alternative positions whereby to openly interconnect either of said inlet ports with said outlet port, said piston-valve having fluid pressure responsive surfaces at opposite ends thereof acting against the fluid pressure forces at said first mentioned inlet ports respectively, one of said surfaces being of larger effective area than the other of said surfaces, whereby whenever the fluid pressures within said inlet ports are substantially equal said piston-valve will be automatically biased in one direction to openly interconnect a preselected inlet port with said outlet port, and whereby upon loss of working pressure within said preselected port said piston-valve will be shifted in opposite direction to interconnect said other inlet port to said outlet port.

5. A shuttle valve device comprising a casing having a cylindrical bore therethrough and a pair of fluid inlet ports and a third fluid outlet port in open communication with said bore, a piston-valve reciprocable within said casing bore and movable therein to alternative positions whereby to openly interconnect either of said inlet ports with said outlet port, said piston-valve having fluid pressure responsive surfaces at opposite ends thereof acting against the fluid pressure forces of said first mentioned inlet ports respectively, one of said surfaces being of larger effective area than the other of said surfaces, whereby whenever the fluid pressures within said inlet ports are substantially equal said piston-valve will be automatically biased in one direction to openly interconnect a preselected inlet port with said outlet port, and whereby upon loss of working pressure within said preselected port said piston-valve will be shifted in opposite direction to interconnect said other inlet port to said outlet port.

6. In an aircraft ground wheel braking system, a wheel brake, a hydraulic jack coupled for operation of said brake, a pair of functionally separate hydraulic pressure supply conduits, a shuttle valve device connected at its opposite ends to different of said conduits at position closely adjacent said jack, said shuttle valve device including a member movable therein in response to differences of pressures thereagainst from said conduits whereby to alternately intercommunicate one of said conduits with said hydraulic jack, a fluid pressure power supply control valve coupled to said conduits and operable by the airplane pilot to permit controlled passage of pressured fluid through said conduits simultaneously, said conduits each having a hydraulic passage fuse device therein at positions closely adjacent said control valve for permitting only predetermined amounts of fluid to flow therethrough incidental to each fluid flow operation.

7. In an aircraft ground wheel braking system, a pair of opposite wheel brakes, a separate hydraulic jack coupled to each of said brakes for operation of said brakes, a pair of functionally separate hydraulic pressure supply conduits leading to each of said brakes, a shuttle valve device connected at its opposite ends to different of said conduits in the region of said brakes whereby hydraulic pressures are applied at opposite ends of each of said shuttle valve devices, said shuttle valve devices each including a member movable therein in response to differences of pressures thereagainst from said conduits whereby to alternately intercommunicate one of said conduits with the corresponding hydraulic jack, fluid pressure power supply control valves coupled to each of said pairs of conduits and operable by the airplane pilot to permit controlled passage of pressured fluid through said paired conduits simultaneously, said paired conduits each having a hydraulic passage fuse device therein at positions closely adjacent the control valves for permitting only predetermined amounts of fluid to flow therethrough incidental to each fluid flow operation.

8. In an airplane, a pair of separate pressured fluid supply devices, an airplane control device, a hydraulic jack for operating said airplane control device, separate conduit means connecting each of said pressured fluid supply means to said hydraulic jack, shuttle valve means interconnecting said conduits at a position adjacent said hydraulic jack and automatically operable in response to pressure differences within said conduits to openly connect into said hydraulic jack only whichever conduit applies to said shuttle valve means the highest fluid pressure.

9. In an airplane, a plurality of separate fluid pressure supply devices, airplane lateral control means at opposite sides of said airplane, jack means coupled to each of said lateral control means for operation thereof, paired conduit means connecting each of said pressured fluid supply means to each of said hydraulic jacks, shuttle valve means interconnecting said paired conduits at positions adjacent each of said hydraulic jacks and automatically operable in response to pressure differences within said paired conduits to openly connect into each of said hydraulic jacks only whichever conduit applies to the shuttle valve the highest pressure.

10. In an airplane, a plurality of separate fluid pressure supply devices, airplane lateral control means at opposite sides of said airplane, jack means coupled to each of said lateral control means for operation thereof, paired conduit means connecting each of said pressured fluid supply means to each of said hydraulic jacks, shuttle valve means interconnecting said paired conduits at positions adjacent each of said hydraulic jacks and automatically operable in response to pressure differences within said paired conduits to openly connect into each of said hydraulic jacks only whichever conduit applies to the shuttle valve the highest pressure, and mechanical link means interconnecting the lateral control means at opposite sides of said airplane so as to insure operation of both of said lateral control means when only one of said jacks is operative.

11. In a hydraulic pressure system including a pair of pressured fluid supply conduits and a third conduit for conveying pressured fluid to means to be actuated thereby, a shuttle valve device comprising a tubular casing having a pair of fluid inlet ports for connection respectively to said first conduits and a fluid outlet port for connection to said third conduit, a cylindrical member within said casing movable therein to alternative positions whereby to openly interconnect either of said inlet ports with said outlet port, said movable member having fluid pressure responsive surfaces at opposite ends thereof acting against the fluid pressure forces of said first mentioned conduits respectively, means operable whereby whenever the fluid pressures within said conduits are substantially equal said movable member will be automatically biased in one direction to openly interconnect a preselected inlet port with said outlet port, and whereby upon loss of working pressure within said preselected port said movable member will be shifted in opposite direction to interconnect said other inlet port to said outlet port.

12. In an aircraft, a wing, flight lateral control means comprising wing lift changing means at opposite ends of said wing for simultaneous operation in opposite sense for aircraft lateral control purposes, a hydraulic jack coupled to each of said wing lift changing means for primary actuation thereof, means interconnecting said wing lift changing means for secondary actuation of one in response to actuation of the other, a pressured fluid supply, conduits interconnecting respectively said supply with said jacks, pilot-operable valve means in the line of each of said conduits for controlling flow of pressured fluid therethrough, and a bypass valve connected into communication with each of said conduits at a position closely adjacent the corresponding control valve, said bypass valves each comprising a movable member normally biased by working hydraulic pressure within the connected conduit against the action of a spring within said bypass valve to direct the fluid pressure forces through said control valves and into said hydraulic jacks, said springs being operable automatically upon loss of hydraulic pressure within said conduits to shift said movable members to cause the fluid pressure forces to bypass said hydraulic jacks, whereby to free the latter for secondary actuation of the connected wing lift change device through said interconnecting means in response to operation of the other wing lift change device.

HAROLD E. WELLS.

REFERENCES CITED

The following references are of record in the file of this patent:

UNITED STATES PATENTS

| Number | Name | Date |
|---|---|---|
| 1,716,121 | Giffen | June 4, 1929 |
| 2,226,821 | Kempson | Dec. 31, 1940 |
| 2,300,694 | Overbeke | Nov. 3, 1942 |
| 2,311,955 | Merker | Feb. 23, 1943 |
| 2,358,228 | Hoof | Sept. 12, 1944 |
| 2,360,839 | Barksdale | Oct. 24, 1944 |
| 2,386,585 | Blank | Oct. 9, 1945 |
| 2,409,335 | Stakelberg | Oct. 15, 1946 |
| 2,431,936 | Hudson | Dec. 2, 1947 |

Certificate of Correction

Patent No. 2,504,096 April 11, 1950

HAROLD E. WELLS

It is hereby certified that error appears in the printed specification of the above numbered patent requiring correction as follows:

Column 7, line 62, after "conduit 52" insert the words *to the wheel brake actuator. If, however, the conduit*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*